United States Patent [19]
Smith et al.

[11] Patent Number: 5,585,185
[45] Date of Patent: Dec. 17, 1996

[54] AUTOMOTIVE DECK LID PIECE

[76] Inventors: Rayna Smith, 2229 Buttonwood Cir., Harrisburg, Pa. 17110; Dennis C. Young, 5001 Apache Dr., Mechanicsburg, Pa. 17055; Steve Bell, 7 Wagners Dr., Shippensburg, Pa. 17257

[21] Appl. No.: 390,129

[22] Filed: Feb. 17, 1995

[51] Int. Cl.$^6$ ........................................ B32B 9/00
[52] U.S. Cl. .................... 428/411.1; 428/88; 428/95; 428/96; 428/97; 428/158; 428/159; 428/160; 428/172; 428/192; 428/284; 428/296; 428/297; 524/915; 156/78; 156/309.9
[58] Field of Search ................................. 428/95, 96, 97, 428/91, 109, 294, 295, 85, 192, 262, 319.9, 88, 158, 159, 160, 172, 284, 296, 297; 524/915; 156/78, 309.9

[56] References Cited

U.S. PATENT DOCUMENTS

| | | | |
|---|---|---|---|
| 3,726,624 | 4/1973 | Schwarz | 425/145 |
| 4,508,771 | 4/1985 | Peoples, Jr. et al. | 428/95 |

*Primary Examiner*—Patrick Ryan
*Assistant Examiner*—Abraham Bahta
*Attorney, Agent, or Firm*—Thomas A. Beck

[57] ABSTRACT

Method of making a layered carpet construction suitable for use for the automotive industry as a "deck lid" wherein the backing of the carpet construction is specially processed to adhere to the backside of the exposed carpet face and a separate layer of foamed material is then secured to the backing.

12 Claims, 2 Drawing Sheets

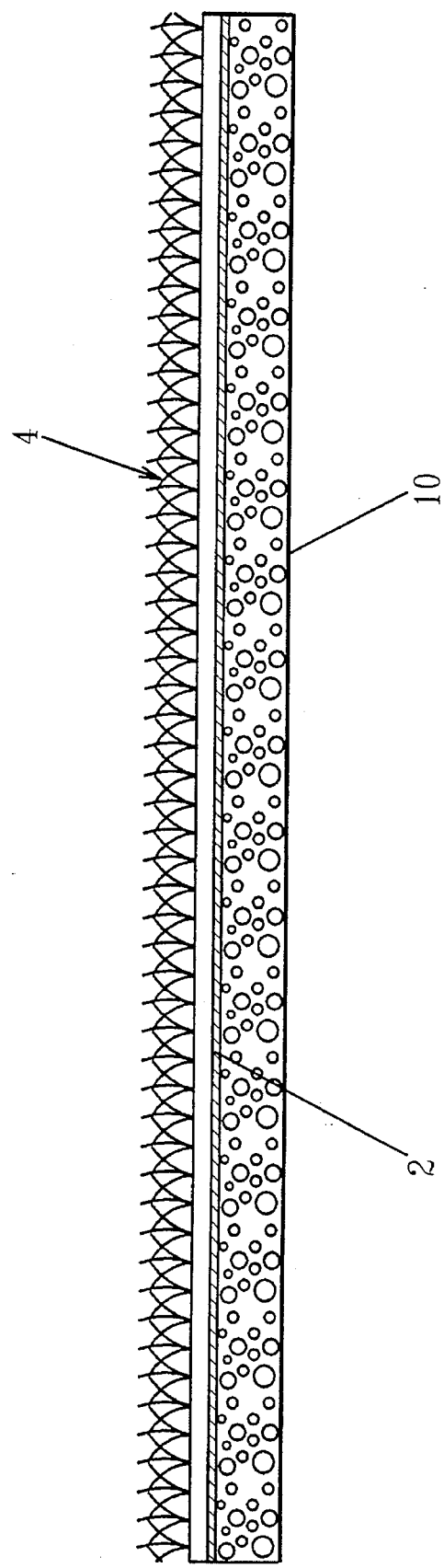

AUTOMOTIVE DECK LID PIECE

BACKGROUND OF THE INVENTION

1. Field of the Invention

The invention relates to a method of making a layered carpet construction suitable for use by the automotive industry as an interior trim part, more specifically a "deck lid" wherein the backing of the carpet construction is specially processed to adhere to the backside of the exposed carpet face and a separate layer of foamed material is then secured to the backing.

2. Description of the Prior Art

Typically, there are no deck lids in automobiles; the automobile mink is formed of the exposed sheet metal that has been painted. Luxury automobiles do include deck lids. A typical deck lid is used in the trunk of an automobile on the underside of the mink lid. The deck lid is made of pressed board with carpet attached thereto via a gluing step. When a shape is required that uses a molding operation, constructions consisting of a moldable felt or thermoplastic resin are used. The carpet used in a typical interior trim part may conveniently consist of a nonwoven carpet face which has a backing affixed thereto. Alternatively, it may consist of a tufted fiber secured in a primary backing which also has a backing affixed to the backside of the primary backing.

The automotive industry has set a standard with respect to trunk interior parts in which it has specified that the deck lid must have a certain dimensional stability in order to qualify as an acceptable article for use. The product of the instant invention was developed because the automotive manufacturers are committed to reducing the weight of its automobiles and thus suppliers of parts must accordingly reduce the weight of the parts supplied to them. Typically a deck lid in use today consists of 9 oz./yd$^2$ polyester nonwoven face material having a backing amounting up to about 35 oz./yd$^2$ polypropylene with scrim.

In the past, some deck lids have been constructed securing the layers using adhesive systems, such as pressure sensitive adhesive pre-coats and an adhesive release surface. Also the prior art discloses a process that uses a cooled upper tool for compression molding a curable elastomeric backing to a carpet.

Other deck lids have been formed by reaction injection molding urethane polymers containing a reinforcing matrix contained therein which have rigid dimensional stability and light weight, but pieces formed from this material are costly and are not recyclable like the interior trim piece of the present invention.

SUMMARY OF THE INVENTION

The present invention relates to a molded layered carpet construction having reduced weight and requisite rigidity when compared with deck lids presently found in the prior art, and the method for making same. A minimum amount of carpet backing is processed to allow it to adhere to the back of the carpet face, and a foam sheet of similar composition is adhered to the carpeted substrate offering the same dimensional stability as obtained in prior art interior trim parts meeting the stringent specifications of the automotive manufacturers while substantially reducing the weight of same. The foamed back composite construction results in a product wherein rigidity is maintained at reduced weight. The molded part of the present invention is rigid enough to maintain its shape while being attached to the sheet metal of the automobile. While this invention applies primarily to nonwoven carpets used in a deck lid, it should not be so limited because the overall method and products produced therefrom can utilize tufted or nonwoven carpet in applications where low weight and rigidity are needed. For example, a tufted construction as used in a door trim could be used.

A particularly significant feature of the interior trim piece of the present invention is that it is totally recyclable. Because it is formed from thermoplastic polymers, when the vehicle in which it is used is disposed of, the trim part can be removed and recycled into any other product which is made from thermoplastic materials.

DESCRIPTION OF THE PREFERRED EMBODIMENTS

Figure 1:
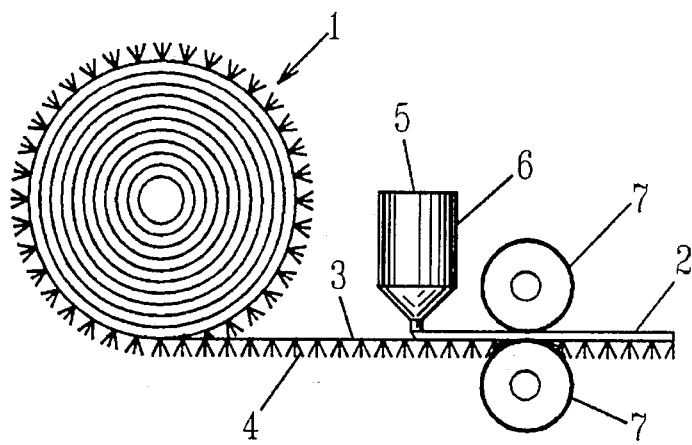
FIG. 1 details the various steps utilized in forming the interior trim piece of the present invention.

The carpet layer forming the composite structure of the present invention can be either nonwoven or tufted.

The preferred carpet layer used in the composite structure of the present invention is a nonwoven fabric. Nonwoven fabrics are characterized by an intimate, three dimensional fiber entanglement produced by the mechanical action of barbed needles rather than by application of heat, moisture and pressure.

Suitable yarns used in the nonwoven fabrics of the present invention are formed from any fiber-forming synthetic polymer, typically nylon 6, nylon 6,6, polyethylene, polypropylene, polyester such as polyethylene terephthalate (PET) or any of the acrylics.

The fibers are first blended by the same carding techniques used for other manufacturing processes. The blended fibers are then arranged into a web or batt by mechanical or air-lay systems. This arrangement may be completely random, i.e. the fibers lay in no established pattern, giving the fabrics equal strength in all directions; or the fibers may be arranged so that they are parallel; to one other in each separate layer used to form the fabric. In addition it is possible to make a needle felt with the fibers all arranged in the same direction. The system where the fiber layers are alternated provides good strength, but fabric made wherein all fibers are arranged in one direction has strength in that direction only.

There are several types of needle punching machines used to make the nonwoven fabrics used in the present invention, but the operation of all is similar. The needles, which have barbs protruding from the shaft, move through the fibers, and the barbs push the fibers into distorted and tangled arrangements. The web is contained by metal plates above and below, so the fibers cannot be pulled or pushed beyond the web layer. As the web moves slowly through the machine, the needles punch as many times as desired for the end product.

A backing, generally having a melt index of at least about 12, is applied and fused to the underside of the nonwoven carpet to provide fiber-bonding properties.

Tufted carpets are composite structures in which the yarn that forms the pile (the surface of the carpet) typically nylon 6, nylon 6,6, polyethylene, polypropylene, polyester such as polyethylene terephthalate (PET), acrylics, wool, cotton and the like,.is needled through a base or backing fabric such as a spun polyester. The yarn used in forming the pile of a tufted carpet can be made of any fiber known to be useful for tufted carpets, The base of each raft extends through the backing fabric referred to above, and is visible on the bottom surface of the composite structure. Tufted carpets may be classified as loop and cut pile carpets.

In loop carpets, yarn loops are formed by needling or punching a continuous yarn through the base fabric, thus forming the base of the carpet, while the tops of the loops are generally ¼ to ¾ inch long, thus forming the wearing surface of the carpet.

Cut pile carpets although not generally used in deck lids, may be used if convenient. These have the same base as the loop carpet, however the tops of the loops have been split or the tips of the loops have been cut off. The surface of the cut pile carpet is thus formed by the open ends of the numerous "U"-shaped pieces of yarn. The base of the "U"-shaped yarn is embedded in the base fabric.

The loops of yarn are needled through and embedded in the primary backing (which combination forms the raw tufted carpet), thus forming the tufted base.

The base fabric or primary backing may be of any known type in the art, such as nonwoven polymer fabric. The aforementioned primary backings are formed from materials such as woven or nonwoven, (e.g. spun-bonded) polypropylene and nonwoven polyester webs and fabrics and blends thereof.

The tufts are inserted by needling into a base fabric and are only loosely attached. An application of a back coating is, therefore, required to secure the mils firmly in place as well as to consolidate and stiffen the carpet foundation. Other objectives in the application of back-coating compositions include dimensional stability and providing a firm but flexible hand and sound insulation.

The backing material is a low melting thermoplastic material, often filled with inorganic particulate fillers such as calcium carbonate, barium sulfate or talc.

The present invention utilizes less resin than was formerly used in fabricating the deck lid. Instead, a limited amount of resin is applied as the backing and subsequently a suitable non-crosslinked foam sheet is applied thereon.

The preferred foam used in accordance with the present invention is made using a suitable foaming system from a suitable polypropylene such as Profax PF814 supplied by Montel. This polypropylene is a non-crosslinked, high melt strength material that provides rigidity as well as moldability. Other foamable resins having these properties can also be used.

The nonwoven carpet as described above having an extruded polypropylene backing thereon, is heated in an infrared oven so that the temperature of the polypropylene backing reaches a temperature of about 380° F. The carpet is then withdrawn from the oven and a polypropylene foam sheet is then contacted with the heated polypropylene surface. The composite is then transferred to a tool (a mold) and is molded into the desired shape. The three layers are fused and a lightweight rigid carpet composite is obtained.

The following example serves to illustrate the invention in greater detail.

EXAMPLE

Figures 1, 2:
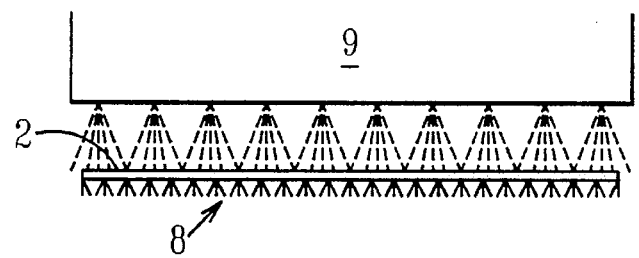
FIG. 2 depicts a cross section of the interior trim piece of the present invention.
Figures 1, 2, 3:
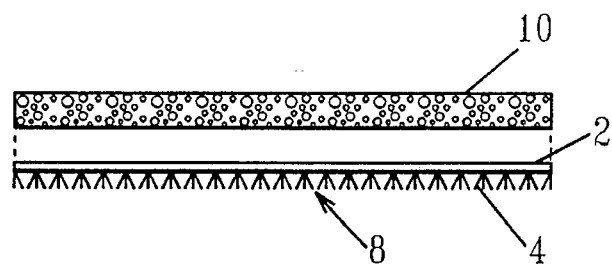
Figures 1, 2, 3, 4:
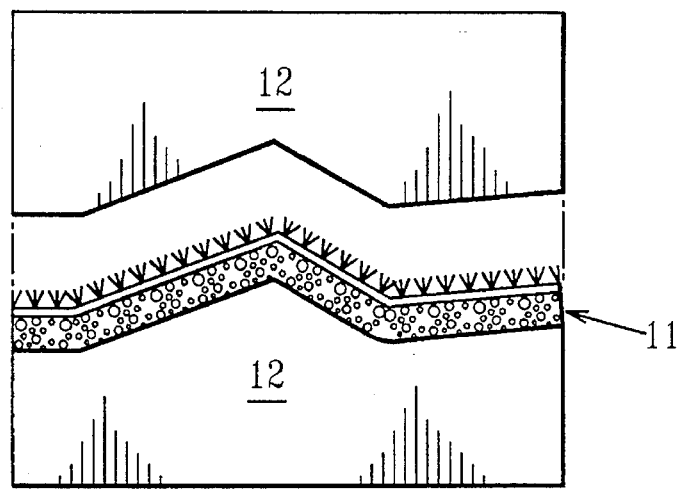

Referring to FIG. 1—1, using known techniques, a roll of nonwoven polyethylene terephthalate carpet fabric (1) was formed. A layer (2) of reinforced filled polypropylene backing extradate (5) was applied from extruder (6) at about 450° F. to the underside (3) of fabric (1) [i.e. the side of carpet (1) that ultimately, in the final product, will not form the face (4) thereof] at a thickness determined by the gap between nip rolls (7) sufficient to provide structural integrity to the carpet. The continuous line of carpet with backing, forming an intermediate coated carpet product, was cooled and rolled up for storage (not shown). In FIG. 7-2, a piece (8) of the nonwoven carpet (1), described above, having the extruded polypropylene backing (2) thereon, was cut from the roll and was heated within a heating table [an infrared oven] (9) so that the temperature of polypropylene backing (2) reached a temperature of about 380° F. Using piece (8) that has been withdrawn from oven (9), FIG. 1–3 depicts polypropylene foam sheet (10) which was formed using known foaming techniques from Profax PF 814 supplied by Montel Co., being contacted with heated polypropylene backing surface (2) to form a composite. Resulting composite (11) was then transferred to a tool (12) and molded into a deck lid trim (not shown). The resulting product was a lightweight rigid carpet composite comprising three distinct layers as depicted in FIG. 2.

To establish that molded trim piece possessed the automotive manufacturers requirements of light weight and dimensional stability, the molded piece was mounted using push pins on a simulated production support foundation, i.e. a luggage compartment, formed from sheet metal. The test was designed to determine specifically whether under less than ideal conditions, the piece will not expand, shrink or warp to the extent that such will interfere with normal function of the piece or cause objectionable or unsightly gaps. As noted above the piece is mounted to simulate the "in-body" position that the piece will occupy in the luggage compartment of the automobile. The assembly of support foundation and piece mounted thereon were subjected to a series of different environmental cycles including: first conditioning the assembly in a controlled atmosphere, then exposing it 24 hours at 95 +/−5% relative humidity at 38 +/−2° C.; 24 hours at 80 +/−2° C. in an air circulating oven; 24 hours at 95 +/−5% relative humidity at 38 +/−2° C.; 24 hours at 80 +/−2° C. in an air circulating oven. After subjecting it to these cycles, the piece was examined to determine whether it has undergone any of the objectionable phenomena detailed above. The piece evidenced no objectionable sags, i.e. greater than 12 mm, at any of the non-supported areas. Visual inspection revealed that it had not undergone excessive expansion, shrinkage or warpage so a useful trim piece having the requisite dimensional stability and light weight was obtained.

Having thus described our invention, what we claim and desire to protect by Letters Patent is:

1. A carpet composite suitable for interior automotive trim applications comprising a nonwoven carpet construction formed from synthetic thermoplastic polymer fibers, or a tufted carpet construction, said carpet having a face side and an underside;

a backing layer of polypropylene having a melt index of at least about 12 fused to said underside of said nonwoven or tufted carpet construction; and a layer of rigid non-crosslinked polypropylene foam fused to said backing layer of polypropylene.

2. The carpet composite defined in claim 1 wherein said polypropylene comprising said backing layer contains an inorganic filler.

3. The carpet composite defined in claim 2 wherein said inorganic filler is selected from the group consisting of calcium carbonate, barium sulfate and talc.

4. The carpet defined in claim 2 wherein said carpet is a nonwoven carpet.

5. The carpet defined in claims 4, wherein said nonwoven carpet is formed from a fiber-forming polymer selected from the group consisting of nylon 6, nylon 6,6, polyethylene, polypropylene, polyester or polyacrylic.

6. The carpet defined in claim 5 wherein said fiber-forming polymer is a polyester.

7. The carpet defined in claim 6 wherein said polyester is polyethylene terephthalate.

8. The carpet defined in claim 2 wherein said carpet is a tufted carpet.

9. The carpet defined in claims 8, wherein said tufted carpet is formed from a fiber-forming polymer selected from the group consisting of nylon 6, nylon 6,6, polyethylene, polypropylene, polyester, polyacrylic, wool or cotton.

10. The carpet defined in claim 9 wherein said fiber-forming polymer is a polyester.

11. The carpet defined in claim 10 wherein said polyester is polyethylene terephthalate.

12. A method for making a carpet composite suitable for automotive trim applications comprising a nonwoven carpet construction formed from synthetic thermoplastic polymer fibers, or a tufted carpet construction, said carpet having a face side and an underside comprising the following steps:

applying a backing layer of polypropylene having a melt index of at least about 12 and fusing said backing layer to said underside of said nonwoven or tufted carpet construction to form an intermediate coated carpet product;

heating said underside of said intermediate coated carpet to a temperature of about 380° F.;

contacting said backing layer on said underside of said intermediate coated carpet with a layer a layer of rigid non-crosslinked polypropylene foam;

fusing said backing layer to said rigid non-crosslinked polypropylene foam;

molding the resulting product into an automotive trim piece.

\* \* \* \* \*